United States Patent [19]

Newbold, Jr.

[11] 4,335,298
[45] Jun. 15, 1982

[54] REINFORCED PLASTIC CONTAINER WITH AN INTEGRAL HEATING ELEMENT

[75] Inventor: Robert W. Newbold, Jr., Cincinnati, Ohio

[73] Assignee: Plas-Tanks Industries, Inc., Fairfield, Ohio

[21] Appl. No.: 251,150

[22] Filed: Apr. 6, 1981

Related U.S. Application Data

[62] Division of Ser. No. 34,775, Apr. 30, 1979, Pat. No. 4,287,663.

[51] Int. Cl.³ .............................................. F27D 11/02
[52] U.S. Cl. ...................................... 219/441; 29/613; 219/436; 219/510; 219/544
[58] Field of Search ................. 29/611, 613; 219/345, 219/385, 386, 338, 407, 409, 405, 432, 426, 438, 439, 441, 427, 436, 521, 528, 544, 543, 530, 510; 264/255, 258, 272; 156/99

[56] References Cited

U.S. PATENT DOCUMENTS

| | | | |
|---|---|---|---|
| 2,282,078 | 5/1942 | Morey | 219/436 X |
| 2,718,583 | 9/1955 | Noland et al. | 219/544 X |
| 3,031,739 | 5/1962 | Boggs | 29/613 |
| 3,177,341 | 4/1965 | De Woody et al. | 219/385 |
| 3,322,113 | 5/1967 | Simjian | 219/439 X |
| 3,513,296 | 5/1970 | Brangs et al. | 219/438 |
| 3,740,281 | 7/1973 | Fujiwara | 156/99 |
| 3,788,513 | 1/1974 | Racz | 220/64 |
| 4,030,953 | 6/1977 | Rutschow et al. | 264/255 X |

Primary Examiner—Volodymyr Y. Mayewsky
Attorney, Agent, or Firm—Kinney and Schenk

[57] ABSTRACT

A plastic reinforced fiberglass container has heating element integrally bonded into the container's interlaminate structure and preferably between the corrosion liner and the structural lamina to permit efficient heating of the container contents. A thermocouple is also embedded in the interlaminate structure and preferably positioned at the same location to achieve sensitive temperature control of the container's contents.

3 Claims, 8 Drawing Figures

REINFORCED PLASTIC CONTAINER WITH AN INTEGRAL HEATING ELEMENT

This is a division, of application Ser. No. 06/034,775, filed Apr. 30, 1979 now U.S. Pat. No. 4,287,663.

BACKGROUND

The invention relates generally to reinforced plastic containers and more specifically to a reinforced plastic container with a heating element integrally bonded in the container's interlaminate structure and the method of making the same. The invention will be disclosed, by way of example, in connection with a reinforced fiberglass tank of the type commonly used in the chemical and food processing industries. The tank of the preferred embodiment has a heating element integrally bonded between a corrosion barrier and a support layer or lamina in the composite laminate structure. The invention, however, relates more generally to containers and may be used for other types of containers, as for example fiberglass pipe, with integrally formed heating means.

The conventional method used in the past for heating fiberglass containers, as for example fiberglass tanks, has been to externally wrap a heating tape, of either polyester or TEFLON (TEFLON is a trademark of the E. I. DuPont Company of Wilmington, Delaware for polytetrafluoroethylene) containing an electrical resistance heating element, about the periphery of the container. When energized, the heating elements were operative to transfer heat to the container's contents, but only after transferring the heat through the thermal resistance of the entire container wall.

Another method of heating container contents has been to externally wrap an electrical heating blanket, usually formed of fiberglass or silicone, and to heat the container contents by again energizing the heating elements. In addition to the disadvantage of being required to transfer the heat through the container wall prior to heating the container contents, heating blankets are frequently difficult to apply or to wrap around a container.

Further difficulties with externally applied heating elements have resulted from nozzles or drains which are fastened onto containers as accessories and which interfere with the wrapped heating elements.

Additionally, many tanks are used outdoors and are frequently the objects of vandalism. When subjected to flying projectiles, as for example rocks and bullets, the externally applied heating systems experience failure. Often, damage to heating elements, which are occasionally covered by insulation on the peripheral sidewalls of the tank, necessitated the removal of all of the insulation material and the replacement of the entire heating system.

Secondary layups have also been used to apply heating elements to tanks. A heating element was placed or overlayed upon a surface of an otherwise completed or used tank and covered with resin in an attempt to cover the heating element and to secure it to the container. This overlaying, even when placed on the inside of the tank, resulted in a number of disadvantages. First, the new surface which was necessitated to cover the heating element was not molded. Thus, the resulting surface was not smooth and had diminish cleanability as compared to a molded surface. This last mentioned consequence takes special significance for containers used in certain industries, as for example the food industry, where even small imperfections in the surface may substantially increase the possibility of bacteria buildup. Further, secondary layups are inherently more difficult to bond and a real and active danger exists that the secondary layup will experience laminate shear or separation from the primary surface.

In the past, the disadvantages noted above were tolerated for lack of a better alternative. Applicant, however, has discovered a new and novel method of forming a reinforced plastic fiberglass container with an integral heating means that overcomes the disadvantages of the prior art. A heating element, according to the present invention, can now be placed in a container's interlaminate structure without deparating and without deleteriously affecting the physical properties and characteristics of the resulting structure.

Accordingly, it is an object of the present invention to provide a method of forming a fiberglass container with an internal molded surface adapted to interface with the container contents and having a heating element integrally formed in the container's interlaminate structure.

It is a further object of the present invention to provide a method of forming a fiberglass container in which a heating element is intimately positioned with respect to the contents to be heated.

It is another object of the present invention to provide a method of forming a heated fiberglass container which is energy efficient.

It is yet another object of the present invention to provide a method of forming a fiberglass container with a heating element formed in the interlaminate structure which does not reduce the structure's physical strength characteristics.

It is still another object of the present invention to provide a method of forming a fiberglass container with heating means which are guarded against vandalism.

It is still another object of the present invention to provide a method of forming a heating element which is bonded between a corrosion barrier and a structural layer of a container.

It is yet another object of the present invention to provide a method of forming a fiberglass container with high heating capabilities which cannot be damaged by overheating.

It is yet another object of the present invention to provide a method of forming a container with heating elements which do not interfere with auxiliary nozzles, drains, etc.

It is still another object of the present invention to provide a method of forming a container which permits accurate temperature measurement and control of the container contents.

SUMMARY OF THE INVENTION

In accordance with the invention, a mold is covered with a reinforced plastic material. An electrical resistance heating element encapsulated in a plastic material compatible to the reinforced plastic covering is then placed on the covered mold. After the encapsulated resistance heater is secured to the plastic covered mold, a further covering of plastic reinforced material is applied to the covered mold and bonded to the encapsulated resistance heating element and to the reinforced plastic material which was applied prior to the placement of the encapsulated electrical heating element.

In the most preferred form, the invention provides a reinforced plastic fiberglass container with a relatively thin chemical and corrosion resistant molded barrier supported by a structural layer which is integrally bonded to the corrosion barrier. An electrical resistance heating element is sandwiched between the corrosion barrier and structural layer and bonded integrally to both the corrosion barrier and the structural layer in a manner which eliminates any reduction in the physical strength of the composite laminate structure.

The container is preferably formed by covering a mold with a veil of chemical and corrosion resistant grade of fiberglass and thereafter covering the veil with a backup layer of chop glass, resin and a catalyst for inducing an exothermic chemical reaction which allows molecular cross-linking to take place to form a corrosion barrier. After permitting the corrosion veil and the backup layer to harden, an electrical resistance heating element encapsulated in E-grade fiberglass is placed on the hardened corrosion barrier and preferably covered with resin. A structural support layer or lamina including a layer of chopped fiberglass, resin and a catalyst is then applied to the corrosion barrier and encapsulated heating element and this structural layer is integrally bonded to the corrosion barrier, sandwiching the heating element between the corrosion barrier and the structural lamina.

BRIEF DESCRIPTION OF THE DRAWINGS

Other objects and advantages of the invention will become apparent upon reading the following detailed description and upon reference to the drawings, in which.

While the invention will be described in conjunction with a preferred embodiment and procedure, it will be understood that it is not intended to limit the invention to that embodiment or procedure. On the contrary, it is intended to cover all alternatives, modifications and equivalents as may be included within the spirit and scope of the invention as defined by the appended claims.

DETAILED DESCRIPTION OF THE PREFERRED EMBODIMENT

A conventional fiberglass reinforced plastic tank or other type of container commonly has walls formed of a chemical or corrosion barrier and a structural or support layer which is integrally bonded to that corrosion barrier. The corrosion barrier is generally relatively thin, approximately 120 mils in thickness, and is generally formed of two parts. The first part is very thin, approximately 10 to 20 mils in thickness, and is formed of C-grade fiberglass or the equivalent. This C-grade fiberglass most commonly, although not always, comes in a sheet form which is rolled up similar to a roll of paper. The C-grade fiberglass sheet is actually a multitude of tiny chopped fibers that are held together by a binder and is commonly referred to as a C-veil.

Figure 1:
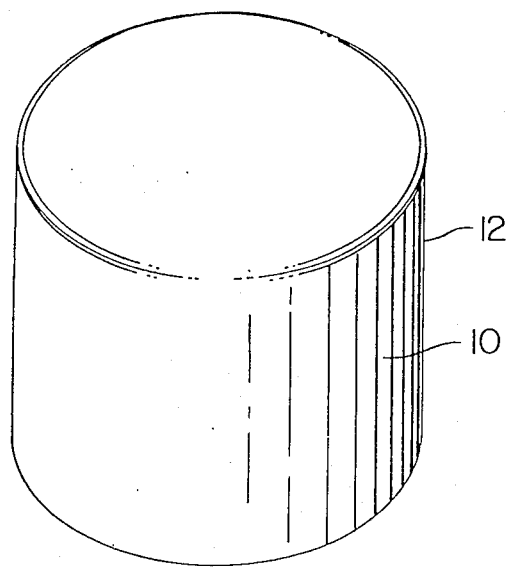
FIG. 1 is a schematic depiction of a mold covered with a thin film of chemical and corrosion resistant fiberglass and resin.

Referring now to the drawings, FIG. 1 depicts a mandrel or mold 10 which is covered by a C-veil 12 which is in turn covered by a layer of a resin, a polyester resin in the preferred embodiment. As should be apparent from the illustration of FIGS. 1–3 and 5–7, the mandrel or mold has a container-shaped configuration which is specifically shown as a tank configuration. In its intended use, the bottom of a container formed on the mold will correspond to the top of the mold. Although not completely necessary, it is preferable to wet down the mold with resin prior to covering it with the C-veil. The C-veil sheets are then wrapped around the resin wetted mold to completely cover it. Several sheets are generally required with a specially cut piece of a veil used to cover the top of the mold (which will ultimately be at the bottom of the tank in the illustrated embodiment). The sheets are overlapped slightly at their junctions to insure that the veil completely covers the mold. After completely covering the mold with the C-veil 12, the veil 12 is completely covered with resin. This resin, together with the resin which was initially applied to the mold, soaks into the C-veil 12 until the veil is saturated. Although, applying the resin only to the backside of the veil after the veil is placed on the mold would suffice, the initial coating of resin assists in soaking the veil from both sides. Further, the initial resin application serves to eliminate trapped air beneath the veil and thus is preferable in forming the liner, a critical part of the container.

Figure 2:
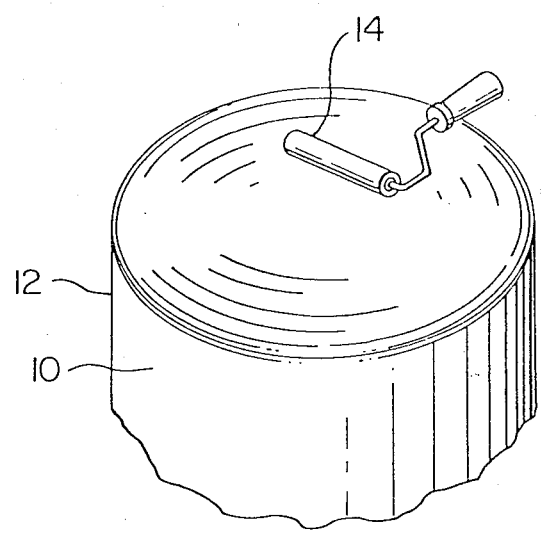
FIG. 2 is a schematic depiction of resin on the mold of FIG. 1 being rolled to a uniform thickness.

As illustrated in FIG. 2, this resin covering is rolled out thoroughly with a roller 14 to once again remove any trapped air and to make the resin covering of uniform thickness. As noted above, the resin used in the preferred embodiment is a polyester resin, most specifically a bisphenol-A fumarate polyester resin. The particular resin used must be chemically compatible with the binder which holds the chopped fibers of the C-veil together. In the preferred embodiment the binder used for this purpose is silane. As will be apparent to those skilled in the art, however, different types of resins, as for example vinyl or epoxy resins, may be used in forming the tank. It is important, however, that the resin which is chosen be compatible with any binders which are used in any fiberglass veils or mats. However, since these limitations are well known in the art and form no part per se of the present invention, no further reference thereto will be made.

Figure 3:
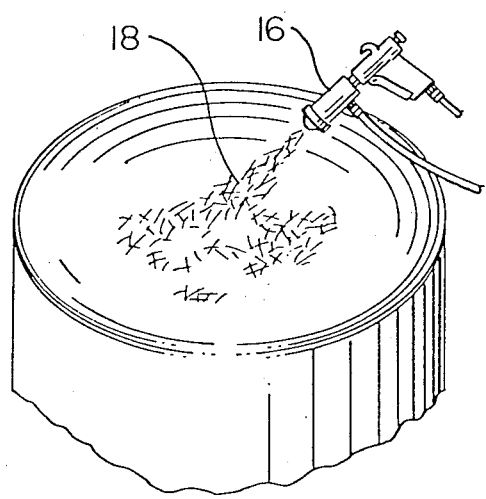
FIG. 3 is a schematic depiction of a spray gun spraying a backup layer of strands of fiberglass, resin and a catalyst onto the covered mold of FIG. 2.

FIG. 3 depicts a spray or chopper gun 16 applying a mixture 18 of chopped glass, resin and a catalyst onto the now uniform surface of FIG. 2. This step immediately follows the rolling step illustrated in FIG. 2 and takes place before the resin is permitted to dry. The contents of this layer of material applied to the container, the chopped glass, resin and catalyst, is commonly referred to as the backup layer and the amount applied is carefully controlled. The backup layer is then carefully rolled out to completely cover the previous layers in a uniform thickness. The amount of backup material supplied is such that when uniformly rolled out with roller 14, it generally has a thickness of approximately 100 to 110 mils. This thickness may vary, however, and a thicker layer may be preferable in certain situations. Again, as those skilled in the art will readily appreciate, the catalyst serves to induce a chemical reaction between the C-veil and the backup layer. In the preferred embodiment, a solution (between 30 percent and 60 percent) of methyl ethyl ketone peroxide sold under the trademark LUPERSOL DDM (sold by Lucidol Division of Pennwalt Corporation) is used. Other catalysts are well known in the art, however, and other catalysts compatible with the selected resin may be used.

After being carefully rolled out to a uniform thickness, the backup layer and C-veil are permitted to undergo an exothermic reaction (in which the tank temperature may reach approximately 320° F.) in which molecular cross linking between the various components thus far applied takes place. This reaction, which was prompted by the catalyst, is irreversible and the plastic becomes thermoset. Once the backup layer is permitted to cool, the corrosion barrier or layer of the container is complete. This reaction, in fact, defines the limits of the corrosion barrier.

Again, it would be appreciated by those skilled in the art, that the backup layer may be applied in different forms, as for example a fiberglass mat formed of chopped glass fiber held together by a binder. A mat comparable to the 100 mil covering applied by the chopper gun would be a 1½ ounce per square foot mat of the type which is commercially available. If a mat form of backup were used, the catalyst would preferably be mixed with resin and applied to the mat by a brush. Regardless of the form, however, the backup layer is preferably E-grade fiberglass.

Figure 4:
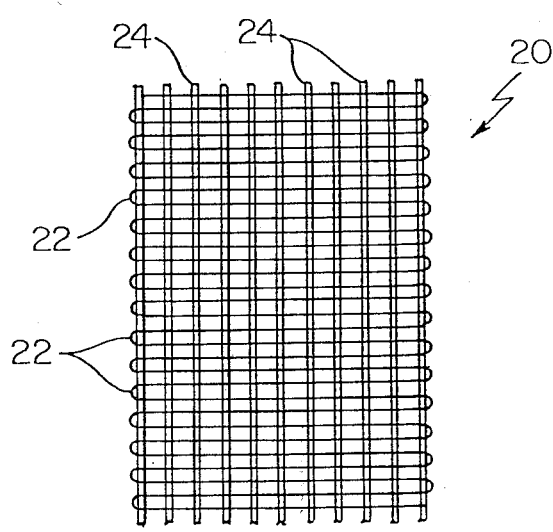
FIG. 4 is a plan view of a piece of braided electrical resistance heating wire encapsulated in E-grade fiberglass.

FIG. 4 depicts a strip of an electrical resistance heating element 20. The electrical wire 22 of the strip 20 transverses and winds about in a serpentine fashion as it is supported by a plurality of elongated fiberglass strands 24 formed of E-grade fiberglass. The electrical wire 22 is also embedded in E-grade fiberglass.

Figure 5:
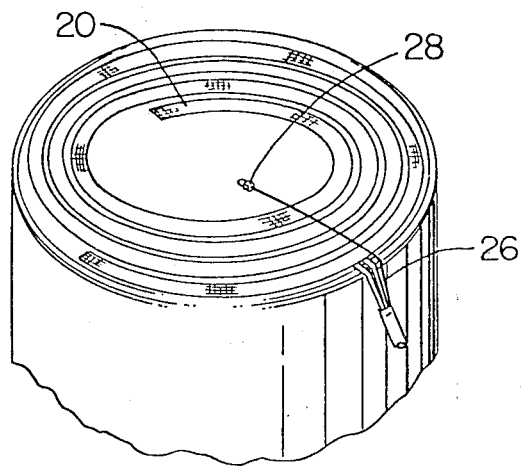
FIG. 5 is a schematic view depicting placement of the encapsulated wire of FIG. 4 onto the covered mold of FIG. 2.

As schematically illustrated in FIG. 5, the encapsulated wire 22 and the heating element 20 shown in FIG. 4 is placed on the bottom (shown on top of the mold—this will, however, be the bottom of the tank in use) of the container adjacent to the backup portion of the corrosion barrier. In the illustrated construction, the heating element 20 is placed in a continuously decreasing circular or spiral arrangement on the tank bottom. Leads 26 from each end of the heating element are grouped together in a bundle and placed to continue along the tank sidewalls in the specifically illustrated arrangement. In the preferred construction, a thermocouple 28 is also placed at this level of the laminate structure in such a position as not to touch the heating element 20, the leads from the thermocouple being bundled with the lead wires from each end of the heating element. If more than one segment of heating element 20 is used, as may be the case for a large container, each segment 20 is preferably wired in parallel.

Figure 6:
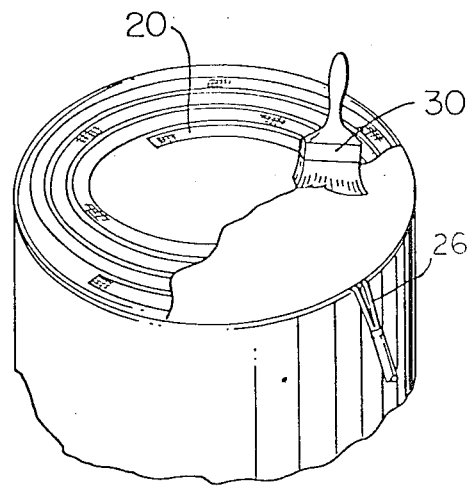
FIG. 6 is a schematic depiction of resin being applied to bond the encapsulated wire of FIGS. 4 and 5 onto the backup layer of FIG. 3.

Once the heating element 20 and thermocouple 28 are in place, resin is applied to cover these elements and to hold them in place adjacent to the surface of the corrosion barrier as shown in FIG. 6 when the resin is applied with a brush 30. Preferably, this resin is rolled out to a uniform thickness with a roller 14 in a manner similar to that shown in FIG. 2. Additionally, as before, the rolling action also tends to remove any trapped air which would cause voids and reduce efficiency.

Figure 7:
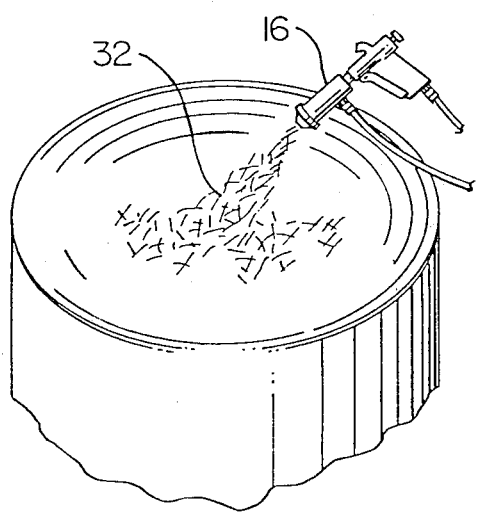
FIG. 7 is a schematic depiction illustrating the application of a mixture of fiberglass, resin and catalyst to the cover mold of FIG. 5.

Once the heating element 20 and thermocouple 28 are secured in place, the container's structural layer may then be applied. The exact form of the structural layer may vary depending upon the application for which the particular container is designed. For example, a small tank or pipe may have a structural layer of only chopped glass, resin and catalyst of approximately 100 mils in thickness. FIG. 7 depicts such a structural layer of chopped glass, resin and catalyst mixture 32 being sprayed onto the liner and heating element in a manner similar to that illustrated in FIG. 3. This layer of material would also be rolled out to a uniform thickness with a roller as illustrated in FIG. 2.

Other types of structural layers are possible and would be preferable in some applications. For example, it may be desirable to wrap strips of continuous filament winding, continuous filaments of glass which are wrapped around lines, about the sidewalls of a tank for purposes of reinforcement. This type of reinforcement provides a very high tensile strength. For a large tank, it would be desirable to reinforce the structure with woven roving, a continuous strand of glass that is woven in two directions, to provide reinforcement in each direction. When either continuous filament winding or woven roving are used, they are generally wrapped around the liner and chopped glass, resin and catalyst is sprayed over these reinforcements in a manner analogous to those previously described.

Figure 8:
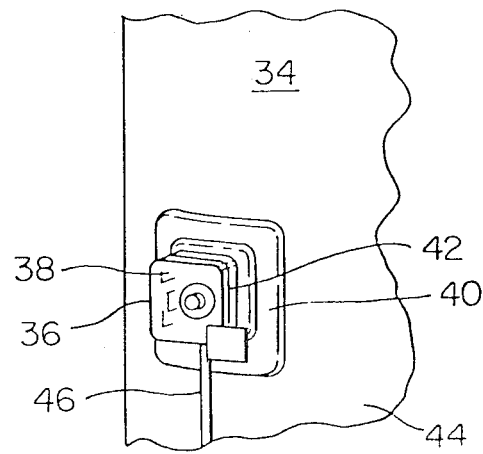
FIG. 8 is a perspective view of a a portion of a fiberglass reinforced plastic tank which has been made according to the present invention.

FIG. 8 shows a a portion of the finished fiberglass reinforced plastic tank formed in the steps illustrated in FIGS. 1–3 and 4–7 with a control box 36. The wiring leads 26 to the heating elements of the preferred tank extend from the bottom and up the tank sides to a predetermined location at which the control box is mounted. With the exception of the wire ends which are bundled up and protected, the lead wires 26 from the heating surface to the control box location are covered by the structural layer when it was applied. Thus, the lead wires 26, like the heating elements 20 and the thermocouple 28, are sandwiched between the corrosion liner and the structural layer in the interlaminate wall structure. The ends of the lead wires 26, however, extend through the structural lamina for connection to the control box 36.

The controls 38 (The controls are conventional and not specifically illustrated) of the preferred embodiment are also mounted the control box 36 in a fiberglass enclosure and this enclosure is laminated to the structural layer of the container. As seen in FIG. 8, mats 40 of fiberglass are placed on each of the control enclosure's sidewalls 42 and extend continuously onto the tank surface 44. Resin is then applied to the mats to bond them to both the tank and the control enclosure.

Once the control enclosure is mounted, a mixture of resin and paraffin wax is applied to the exterior of the container to cover the structure with an air inhibiting coating. This wax and resin mixture, which may also contain a pigment to color the container, permits final curing of the structural layer. The controls 38 are then placed inside the control enclosure and connected to the heating elements 20 and thermocouple 28 as well as an external power supply, the leads to the external power supply being contained in an external conduit 46.

The present invention thus provides both a fiberglass container having a molded surface adapted to interfere with the container contents and an integral heating means. The application of reinforced plastic material to a mold is interrupted and an electrical resistance heating element, encapsulated in a plastic material which is bondable to the reinforced plastic material, is secured to the initially applied material. A further covering of plastic reinforced material is then applied to cover the mold. This further covering is bonded to the first applied reinforced plastic material and to the encapsulated heating element. In the preferred form, the heating element is sandwiched between the corrosion layer or liner (whose limits are defined by an exothermic chemical reaction) and a support structure which is heated to the liner. As such, the heating element becomes a part of the container itself.

Moreover, the heating element is intimately positioned with respect to the container contents. It is separated in the illustrated form only by the relatively thin corrosion liner. The significance of this proximity to the container contents is that the thermal resistance between the heating elements and the contents to be heated is significantly reduced. The energy required to transfer a predetermined quantity of heat is correspondingly reduced. This placement of the heating elements avoids the thermal resistance of the structural layer of the container. Since fiberglass has a thermal resistance approximately 200 times that of steel, the difference in thermal resistance becomes significant. Also, the container contents are much more responsive to temperature changes initiated by the heating elements as the transient heat transfer characteristics of the heating system is greatly improved.

Due to the high thermal resistance of a fiberglass container's structural layer, the watt density of heating elements used in the past has been sufficiently high to damage fiberglass, particularly when the heat sink provided by the container contents ceased to interface with the portion of the container structure opposite the heating element. This situation frequently occurred when the heating elements were placed on the side of a tank and a fluid level inside the tank was lowered beneath the level of the heating element. The watt density of the present invention's heating element sandwiched between the liner and corrosion layers may be reduced to a level which will not cause the degradation of the fiberglass, even when the container is completely empty. Furthermore, this watt density may be lowered while still maintaining the heating capability of prior heating elements with dangerously high watt densities externally applied to the structural layer.

The present invention also lends itself to improved temperature control of a container contents while still avoiding any possibility of contamination. Since the thermocouple sensing means is also intimately positioned with respect to the container contents, the sensed temperature of that location is very nearly the same as the container contents.

Physical tests performed on a laminated fiberglass structure constructed according to the method presented in the preferred embodiment has shown that virtually no difference exists between the structure with an integral heating means and a comparable fiberglass laminate without such heating means. These tests included tensile tests, compression tests, and flexual tests.

The heating elements in the preferred embodiment were placed exclusively on the tank bottom. Applicant has found that the present invention is particularly well suited for such placement. Placement on the bottom of a container permits heating of the entirety of the contents due to natural convection currents and frees the sidewalls of the container for other uses without interfering with auxiliary drains, nozzles, etc. The invention is quite applicable for use on container sidewalls however, and it may be advantageous to place heating elements in the interlaminate structure of a container sidewall between the corrosion liner and the structural member in the same manner as described above for the container bottom.

Thus, it is apparent that there has been provided, in accordance with the invention, a method and apparatus that fully satisfies the objects, aims, and advantages set forth above. While the invention has been described in conjunction with a specific embodiment thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. A plastic fiberglass reinforced container with integral heating means, comprising:
    (a) a corrosion liner, said corrosion liner including:
        (i) a continuous molded internal surface of C-grade fiberglass, said molded surface being adapted to interface with the container contents; and
        (ii) a backup layer of E-grade fiberglass bonded to said C-grade fiberglass;
    (b) a structural lamina of E-grade fiberglass bonded to said backup layer;
    (c) an electrical heating element encapsulated in E-grade fiberglass positioned between said corrosion liner and said structural lamina, said heating element being bonded to both the corrosion liner and the structural lamina and being adapted to heat the container contents; and
    (d) electrical lead wires extending through said structural lamina and being adapted to connect said heating element to an external electrical power source.

2. A container as recited in claim 1 further including a thermocouple embedded within the laminate structure.

3. A container as recited in claim 2 further wherein said thermocouple is positioned between said corrosion liner and said structural lamina.

* * * * *